(12) United States Patent  
Funamoto

(10) Patent No.: US 7,260,271 B2  
(45) Date of Patent: Aug. 21, 2007

(54) DIGITAL IMAGE DATA CORRECTION APPARATUS, DIGITAL IMAGE DATA CORRECTION METHOD AND DIGITAL IMAGE PICKUP APPARATUS

(75) Inventor: Kenji Funamoto, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 840 days.

(21) Appl. No.: 10/602,759

(22) Filed: Jun. 25, 2003

(65) Prior Publication Data

US 2004/0001152 A1    Jan. 1, 2004

(30) Foreign Application Priority Data

Jun. 26, 2002    (JP)    ............... 2002-185805

(51) Int. Cl.
*G06K 9/40*    (2006.01)
*H04N 3/22*    (2006.01)

(52) U.S. Cl. ................. 382/275; 382/312; 348/745

(58) Field of Classification Search ............... 382/275, 382/305, 312; 315/10; 356/339; 348/187, 348/745–747; 358/474
See application file for complete search history.

(56) References Cited

U.S. PATENT DOCUMENTS

| 5,235,528 A | * | 8/1993 | Silver et al. ............... 378/7 |
| 5,432,404 A | * | 7/1995 | Ogino et al. ............. 315/10 |
| 5,760,829 A | * | 6/1998 | Sussmeier ............ 348/187 |
| 6,088,098 A | * | 7/2000 | Arndt et al. ............. 356/339 |
| 6,310,662 B1 | * | 10/2001 | Sunakawa et al. ........ 348/747 |
| 6,963,365 B2 | * | 11/2005 | Baron ................... 348/239 |
| 7,050,205 B2 | * | 5/2006 | Koike ................... 358/474 |

FOREIGN PATENT DOCUMENTS

| JP | 6-292207 A | 10/1994 |
| JP | 10-271490 A | 10/1998 |
| JP | 11-250238 A | 9/1999 |
| JP | 11-250239 A | 9/1999 |
| JP | 11-250240 A | 9/1999 |
| JP | 11-252431 A | 9/1999 |
| JP | 2001-101396 A | 4/2001 |

\* cited by examiner

*Primary Examiner*—Kanjibhai Patel
(74) *Attorney, Agent, or Firm*—Birch, Stewart, Kolasch & Birch, LLP

(57) ABSTRACT

The present invention discloses a digital image pickup apparatus. The digital image pickup apparatus reads digital image data from a main memory in a horizontal direction. The digital image pickup apparatus corrects an optical distortion component in the horizontal direction in the digital image data. The digital image pickup apparatus writes the digital image data into the main memory in the horizontal direction, so as to store it without changing the direction. The digital image pickup apparatus further reads the digital image data from the main memory in a vertical direction. The digital image pickup apparatus corrects an optical distortion component in the vertical direction in the digital image data. The digital image pickup apparatus writes the digital image data into the main memory in the vertical direction, so as to store it without changing the direction.

16 Claims, 15 Drawing Sheets

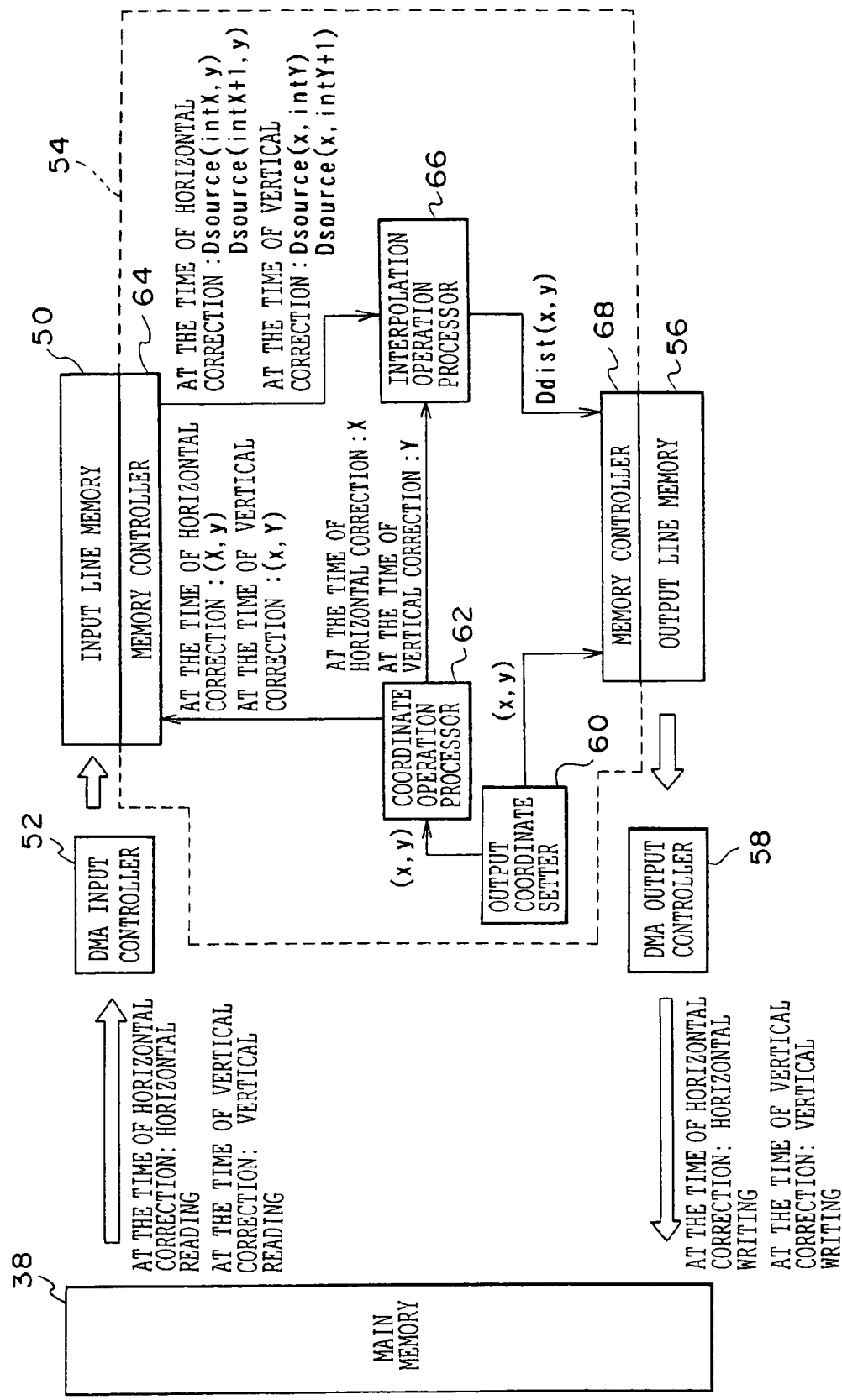

CORRECTION OF OPTICAL DISTORTION
COMPONENT IN HORIZONTAL DIRECTION

CORRECTION OF OPTICAL DISTORTION
COMPONENT IN VERTICAL DIRECTION

CORRECTION OF OPTICAL DISTORTION
COMPONENT IN HORIZONTAL DIRECTION

CORRECTION OF OPTICAL DISTORTION
COMPONENT IN VERTICAL DIRECTION

DIGITAL IMAGE DATA CORRECTION APPARATUS, DIGITAL IMAGE DATA CORRECTION METHOD AND DIGITAL IMAGE PICKUP APPARATUS

CROSS-REFERENCE TO RELATED APPLICATION

This application claims priority under 35 USC 119 from Japanese Patent Application No. 2002-185805, the disclosure of which is incorporated by reference herein.

BACKGROUND OF THE INVENTION

1. Field of the Invention

The present invention relates to a digital image data correction apparatus and a digital image data correction method for correcting optical distortion of digital image data, and a digital image pickup apparatus having the digital image data correction apparatus.

2. Description of the Related Art

An image pickup apparatus includes an apparatus for picking up an object to be photographed through an optical lens of a silver halide camera, a digital camera or the like, and obtaining an image showing the object. In this image pickup apparatus, distortion occurs around the obtained image by refraction of the optical lens. The distortion is generally called optical distortion. The lens used in the image pickup apparatus is constituted so as to cancel the optical distortion. In the case of a zoom lens, however, it is difficult to correct both a telephoto end and a wide end with the same lens configuration. Large optical distortion, therefore, easily occurs. Even a single-focal lens requires an expensive lens material or a thicker lens configuration for correction. It is, therefore, difficult to provide a thin and economical lens configuration. As a result, the optical distortion still remains.

When an image obtained is recorded on a film with a silver halide camera, the recorded image cannot be corrected. The optical distortion is, therefore, determined by a lens performance. On the contrary, when an image is obtained by digital data and is recorded onto recording media like the digital camera, the image can be corrected by an operating process even after recording. In the digital camera field, therefore, conventionally, techniques for the correction of optical distortion have been proposed.

One technique for correcting such optical distortion includes a method of representing a correcting amount by an approximation formula so as to perform correction as described in Japanese Patent Application Laid-Open (JP-A) Nos. 11-250238, 11-250239, 11-250240 and 11-252431. It is generally known that an amount of data conversion due to the optical distortion can be approximately expressed by a polynomial depending on a distance from an optical center. In this method, therefore, an inverse number of the polynomial is used as a correcting expression. Concretely, a coordinate on an uncorrected image corresponding to each pixel on a corrected image is calculated based on the polynomial by a CPU. The each pixel is interpolated with pixel data around the calculated coordinate, so that correction is performed.

In the prior technique, however, when the interpolation is carried out by bi-linear interpolation, for example, an operation using four-pixel data around the calculated coordinate is necessary. The operation for the correction becomes, therefore, complicated. Accordingly, the CPU needs to do a large amount of calculation only for the processing of one pixel. There, therefore, arises such a problem that the processing of an entire image takes much processing time. Particularly when the number of pixels of the digital image data is increased, the time required for the correction also increases. In order to achieve further high resolution with a digital image pickup apparatus, therefore, reducing of the correcting process time is demanded.

SUMMARY OF THE INVENTION

The present invention is devised in order to solve the above problems. It is the object of the invention to provide a digital image data correction apparatus, a digital image data correction method and a digital image pickup apparatus which is capable of reducing processing time required for correcting optical distortion.

The digital image data correction apparatus of the invention separately corrects an optical distortion component in a predetermined direction of optical distortion included in the digital image data and an optical distortion component in a crossing direction crossing the predetermined direction of the optical distortion.

According to the digital image data correction apparatus of the invention, the optical distortion included in the digital image data is corrected in such a manner that the correction of the optical distortion component in the predetermined direction and the correction of the optical distortion component in the crossing direction crossing the predetermined direction are carried out separately. As a result, when interpolation is carried out by bi-linear interpolation, for example, the operating process can be executed by using only the two-pixel data in the periphery in the correction of the respective components. The correction can be, therefore, carried out only by the operating process which is simpler than the prior ones. As a result, the processing time required for the correction of the optical distortion can be shortened.

In the digital image data correction apparatus of the invention, the digital image data correction apparatus is connected with a storage component which stores the digital image data therein, and when the optical distortion component in the predetermined direction is corrected, the digital image data is read along the predetermined direction from the storage component, so that the optical distortion component in the predetermined direction is corrected, and the corrected digital image data is written into the storage component parallel to the predetermined direction of the digital image data in which the optical distortion component in the predetermined direction is uncorrected, and when the optical distortion component in the crossing direction is corrected, the digital image data is read along the crossing direction from the storage component, so that the optical distortion component in the crossing direction is corrected, and the corrected digital image data is written into the storage component parallel to the crossing direction of the digital image data in which the optical distortion component in the crossing direction is uncorrected.

As a result, a memory capacity of the storage component can be made smaller.

In the digital image data correction apparatus of the invention, the digital image data correction apparatus is connected with a storage component which stores the digital image data therein, and when the optical distortion component in the predetermined direction is corrected, the digital image data is read along the predetermined direction from the storage component, so that the optical distortion component in the predetermined direction is corrected, and the corrected digital image data is written into the storage component parallel to the crossing direction of the digital image data in which the optical distortion component in the predetermined direction is uncorrected, and when the optical distortion component in the crossing direction is corrected, the digital image data is read along the crossing direction from the storage component, so that the optical distortion component in the crossing direction is corrected, and the corrected digital image data is written into the storage component parallel to the predetermined direction of the digital image data in which the optical distortion component in the crossing direction is uncorrected.

As a result, the entire processing time required for the correcting process can be further shortened.

In the digital image data correction apparatus of the invention, an amount of data conversion due to the optical distortion may be approximately expressed by a polynomial which depends on a distance from an optical center of the digital image data. The polynomial may be a function that does not include a term in which the distance is of an odd order and that include only a term in which the distance is of an even order. Further, a pixel on a corrected coordinate of the corrected digital image data may be interpolated with pixels around an uncorrected coordinate of the uncorrected digital image data corresponding to the corrected coordinate, so that the optical distortion component may be corrected.

A digital image data correction method of the invention includes: a first step of correcting an optical distortion component in a predetermined direction of optical distortion included in digital image data; and a second step of correcting an optical distortion component in a crossing direction crossing the predetermined direction of the optical distortion, separately from the correction of the optical distortion component in the predetermined direction.

A digital image pickup apparatus of the invention includes: an optical lens which images an object to be photographed; a conversion component which photoelectrically converts the imaged object, so as to output digital image data showing the object; a storage component which stores the digital image data therein; and a correction component which separately corrects an optical distortion component in a predetermined direction of optical distortion included in the digital image data and an optical distortion component in a crossing direction crossing the predetermined direction of the optical distortion.

BRIEF DESCRIPTION OF THE DRAWINGS

FIG. 2 is a block diagram showing a detailed structure of an operation processor of a distortion corrector according to the first embodiment.

DETAILED DESCRIPTION OF THE INVENTION

There will be explained below the case where the present invention is mainly applied to a digital camera (digital image pickup apparatus) for picking up a static image. The invention can be applied also to an apparatus (digital image pickup apparatus) for picking up a dynamic image such as a digital video camera.

FIRST EMBODIMENT (Entire Structure)

Figure 1:
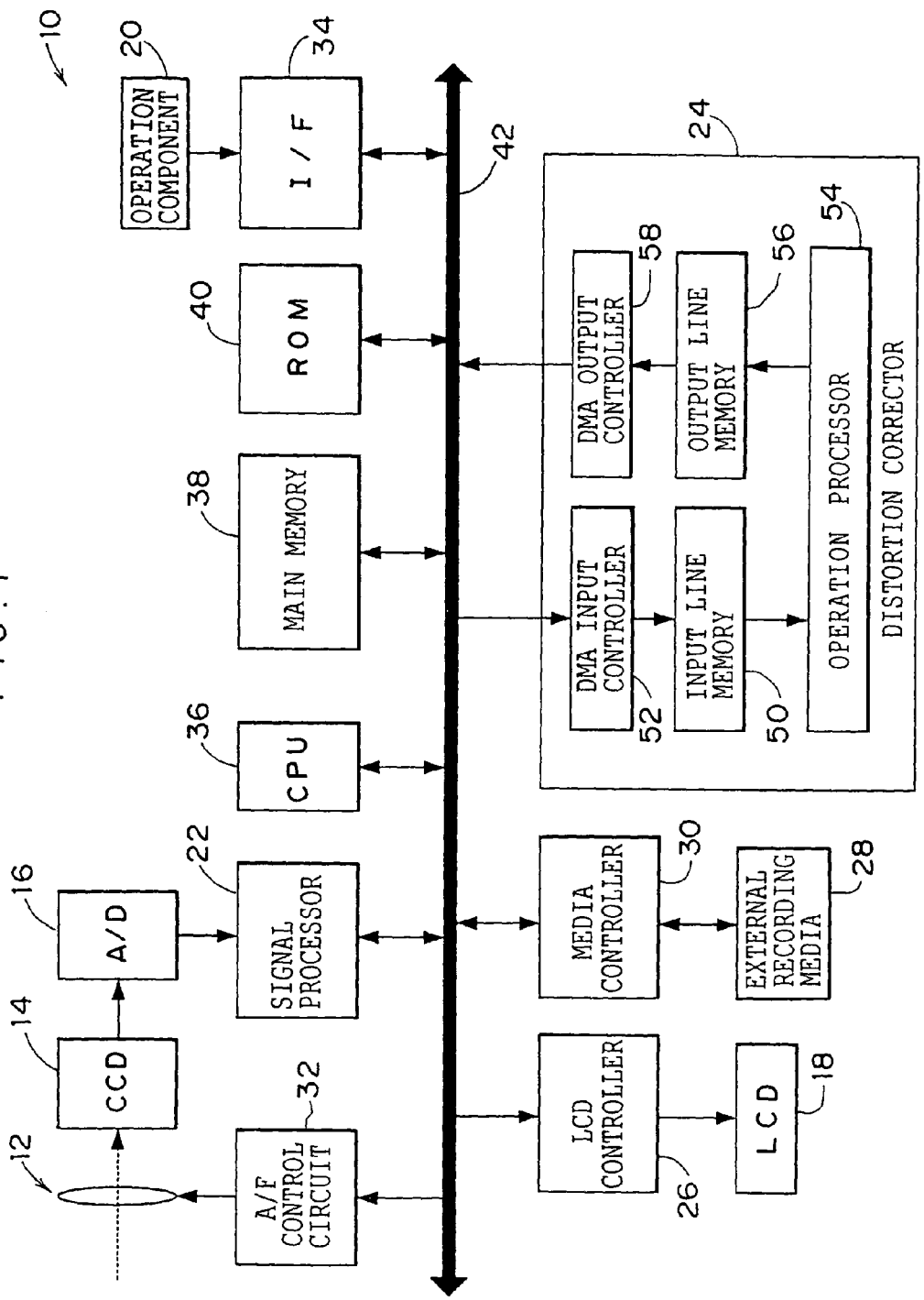
FIG. 1 is a block diagram showing a structure of a digital camera according to a first embodiment.

With reference to FIG. 1, a structure of the digital camera 10 according to the first embodiment will be explained. FIG. 1 shows an entire schematic structure of the digital camera 10.

As shown in FIG. 1, the digital camera 10 according to the first embodiment has an optical unit 12 as an optical lens. The optical unit 12 images an object to be photographed. The digital camera 10 has a CCD (Charge Coupled Device) 14 composing a conversion component. The CCD 14 is provided on a backward side on an optical axis of the optical unit 12. The digital camera 10 has an A/D converter 16 composing the conversion component. The A/D converter 16 converts an analog signal into a digital signal. The digital camera 10 has an LCD (liquid crystal display) 18. The LCD 18 displays an image, which is obtained by the photography of the digital camera 10, and various pieces of information. The digital camera 10 has an operation component 20 which includes a release button, a mode changeover switch, a power source switch, and the like. The operation component 20 is operated by a photographer.

The digital camera 10 further has a signal processor 22 composing the conversion component. The signal processor 22 subjects a predetermined process to an input digital signal, so as to generate digital image data. The digital camera 10 has a distortion corrector 24 as a digital image data correction apparatus of the invention and a correction component. The distortion corrector 24 corrects optical distortion of the digital image data. The digital camera 10 has an LCD controller 26. The LCD controller 26 controls display on the LCD 18. The digital camera 10 has a media controller 30. The media controller 30 controls reading and writing of various pieces of information on an external recording media 28 such as smart media, IC card, CD-R and CD-RW. The digital camera 10 has an A/F control circuit 32. The A/F control circuit 32 adjusts an optical zoom magnification and a focal point of the optical unit 12. The digital camera 10 has an I/F (interface) 34 with respect to the operation component 20. The digital camera 10 has a CPU (central processing unit) 36. The CPU 36 entirely controls the digital camera 10. The digital camera 10 has a main memory 38 as a storage component. The main memory 38 mainly stores the digital image data obtained by image pickup by the CCD 14. The digital camera 10 has a ROM 40. The ROM 40 prestores various programs, parameters and the like.

The signal processor 22, the distortion corrector 24, the LCD controller 26, the media controller 30, the A/F control circuit 32, the I/F 34, the CPU 36, the main memory 38 and the ROM 40 are connected with each other via a bus 42.

The optical unit 12 has a zoom lens group and a focal lens, not shown. The optical unit 12 has a lens moving mechanism. The lens moving mechanism moves the zoom lens group and the focal lens to a direction of an optical axis. As a result, the optical unit 12 is constituted as a zoom lens in which a focal distance can be changed (magnification is variable). The optical unit 12 is connected with the A/F control circuit 32. The zoom lens group is moved to the direction of optical axis by control of the A/F control circuit 32 so that a zoom magnification is desirable one (focal distance variable lens). The focal lens is moved to the direction of optical axis by control of the A/F control circuit 32 so that an incident light showing an object to be photographed which passes through the lenses is imaged on a light receiving surface of the CCD 14 (autofocus (AF) mechanism). As a result, the CCD 14 images a subject based on the incident light showing the object to be photographed which passes through the lenses of the optical unit 12. The CCD 14 further outputs an analog image signal showing the object to be photographed.

An output terminal of the CCD 14 is connected with the A/D converter 16. More specifically, the A/D converter 16 converts the analog image signal showing the object to be photographed output from the CCD 14 into a digital image signal.

The output terminal of the A/D converter 16 is connected with the signal processor 22. More specifically, after an image signal showing the object to be photographed obtained by the CCD 14 at the time of photography is converted from the analog signal into the digital signal, it is input into the signal processor 22. The input digital signal is treated as digital image data. Concretely, in the signal processor 22, the input digital image data are subject to various correcting processes such as white balance adjustment, gamma correction and sharpness correction, and a predetermined digital signal process such as an YC converting process for converting RGB data into an YC signal. The digital image data which are YC-converted by the signal processor 22 are temporarily stored as an uncorrected digital image data into the main memory 38 via the bus 42.

As the main memory 38, a bulk memory such as SRAM or SDRAM can be generally used. Such a memory has characteristics that sequential access in a line direction is fast but access to nonsequential addresses is slow.

The distortion corrector 24 corrects optical distortion of the uncorrected digital image data stored in the main memory 38. The distortion corrector 24 reads the uncorrected digital image data from the main memory 38 and corrects the optical distortion. The distortion corrector 24 further writes a corrected digital image data into the main memory 38. The details of the distortion corrector 24 will be explained later.

In the digital camera 10, the corrected digital image data are compressed by a compressing/expanding circuit, not shown, according to a predetermined compressing format (for example, JPEG). The digital camera 10, thereafter, can store the compressed and corrected digital image data into the external recording media 28 via the media controller 30.

On the other hand, the LCD controller 26 is connected with the LCD 18. The LCD 18 operates under control of the LCD controller 26. At the time of photography, the LCD controller 26 reads the corrected digital image data from the main memory 38 via the bus 42, so as to display the corrected digital image data on the LCD 18. Further, at the time of reproducing the image, the digital image data to be reproduced which are stored in the external recording media 28 are read, so as to be expanded by the compressing/expanding circuit, not shown. The expanded digital image data, thereafter, are displayed on the LCD 18 by control of the LCD controller 26.

The I/F 34 is connected with the operation component 20 which includes various switches and buttons to be operated by the photographer. The CPU 36 can always grasp an operating condition of the operation component 20 by the photographer via the I/F 34. The CPU 36 controls the operations of the respective sections according to the grasped operating condition.

(Details of Distortion Corrector)

The distortion corrector 24 will be explained below in detail.

As shown in FIGS. 1 and 2, the distortion corrector 24 has an input line memory 50. The input line memory 50 stores pixel data for one line. The distortion corrector 24 has a DMA input controller 52. The DMA input controller 52 transmits the pixel data, that represents pixels for one line which compose the digital image data stored in the main memory 38 and which are arranged in the horizontal direction or the vertical direction, from the main memory 38 to the input line memory 50 using DMA (Direct Memory Access). The distortion corrector 24 has an operation processor 54. The operation processor 54 corrects the optical distortion on the image per pixel according to an operation. The distortion corrector 24 has an output line memory 56. The output line memory 56 stores the corrected pixel data for one line obtained by the operation in the operation processor 54. The distortion corrector 24 has a DMA output controller 58. The DMA output controller 58 transmits the corrected pixel data for one line arranged in the horizontal or vertical direction from the output line memory 56 to the main memory 38 using DMA.

The pixel data is data showing colors of the respective pixels composing an image. The digital image data is composed of a plurality of pixel data.

The input line memory 50 and the output line memory 56 do not necessarily need a capacity for one line. The input line memory 50 and the output line memory 56 can be composed of a plurality of memories so as to be used as a ring buffer. Further, FIGS. 1 and 2 show the input line memory 50 and the output line memory 56 as physically different members. Different memory areas in one memory (device) may be, however, used as the input line memory 50 and the output line memory 56.

The DMA input controller 52 is connected with the bus 42 and the input line memory 50. The DMA input controller 52 reads the pixel data for one line from the main memory 38 via the bus 42. The DMA input controller 52 writes the read pixel data into the input line memory 50.

The operation processor 54 is accessibly connected with the input line memory 50 and the output line memory 56. The operation processor 54 generates corrected pixel data in which optical distortion is corrected by an operation using the pixel data in the input line memory 50. The operation processor 54 writes the corrected pixel data into the output line memory 56.

As shown in FIG. 2 in detail, the operation processor 54 has an output coordinate setter 60. The output coordinate setter 60 sets a coordinate of the corrected pixel data output (corrected coordinate or output coordinate) so as to move the pixel data one by one to the horizontal or vertical direction. The operation processor 54 has a coordinate operation processor 62. The coordinate operation processor 62 operates a coordinate on an uncorrected image (uncorrected coordinate) corresponding to the output coordinate set in the output coordinate setter 60. The operation processor 54 has a memory controller 64. The memory controller 64 reads the pixel data around the uncorrected coordinate operated by the coordinate operation processor 62 from the input line memory 50. The operation processor 54 has an interpolation operation processor 66. The interpolation operation processor 66 interpolates the pixel data of the output coordinate with the read pixel data around the uncorrected coordinate, so as to generate the corrected pixel data. The operation processor 54 has a memory controller 68. The memory controller 68 writes the corrected pixel data generated by the interpolation operation processor 66 as the pixel data of the output coordinate set in the output coordinate setter 60 into the output line memory 56.

The operation processor 54 may be mounted with circuits which function as the output coordinate setter 60, the coordinate operation processor 62, the memory controller 64, the interpolation operation processor 66 and the memory controller 68. In the operation processor 54, the functions of the output coordinate setter 60, the coordinate operation processor 62 and the interpolation operation processor 66 may be structured by executing programs.

The output coordinate setter 60 sets the output coordinate. The coordinate operation processor 62 calculates the uncorrected coordinate corresponding to the set output coordinate according to an operation every time when the output coordinate is set (changed) in the output coordinate setter 60.

The DMA output controller 58 is connected with the bus 42 and the output line memory 56. The DMA output controller 58 reads pixel data for one line from the output line memory 56. The DMA output controller 58 writes the read pixel data into the main memory 38 via the bus 42.

With respect to digital image data to be corrected, the distortion corrector 24 according to the first embodiment divides the optical distortion included in the digital image data into an optical distortion component in the horizontal direction and an optical distortion component in the vertical direction. The distortion corrector 24 further carries out correction for each component in time series. More specifically, one digital image data is subjected to the two correcting processes: the correcting process for correcting distortion in the horizontal direction and the correcting process for correcting distortion in the vertical direction.

In the distortion corrector 24, therefore, directions in which the uncorrected digital image data is read from the main memory 38 and the corrected digital image data is written into the main memory 38 (hereinafter, data access directions with respect to the main memory 38) are changed according to the direction of the optical distortion component to be corrected.

Concretely, when the optical distortion component in the horizontal direction is corrected, the DMA input controller 52 reads the digital image data from the main memory 38 in the horizontal direction. The DMA input controller 52 further stores the pixel data for one line arranged in the horizontal direction into the input line memory 50. The DMA output controller 58 reads the pixel data for one line from the output line memory 56. The DMA output controller 58 further writes the pixel data into the main memory 38 in the horizontal direction.

When the optical distortion component in the vertical direction is corrected, the DMA input controller 52 reads the digital image data from the main memory 38 in the vertical direction. The DMA input controller 52 further stores the pixel data for one line arranged in the vertical direction into the input line memory 50. The DMA output controller 58 reads the pixel data for one line from the output line memory 56. The DMA output controller 58 further writes the pixel data into the main memory 38 in the vertical direction.

<Function>

Next, a function of this embodiment will be explained below.

In the digital camera 10 according to the first embodiment, the CCD 14 picks up an image of a subject based on the incident light showing the object to be photographed which passes through the lenses of the optical unit 12. As a result, an analog image signal showing the object to be photographed is obtained. The A/D converter 16 converts the analog image signal into a digital image signal. The signal processor 22 converts the digital image signal into an YC signal. The YC signal is temporarily stored as the uncorrected digital image data into the main memory 38.

The distortion corrector 24 reads the uncorrected digital image data from the main memory 38, so as to correct the optical distortion. The corrected digital image data is, thereafter, stored in the memory 38 again (detailed later). The corrected digital image data is displayed on the LCD 18 via the LCD controller 26. The corrected digital image data is recorded onto the external recording media 28 via the media controller 30. At the time of display on the LCD 18, the uncorrected digital image data may be used. The picked-up object to be photographed is, therefore, displayed immediately.

(Optical Distortion Correcting Process)

The optical distortion correcting process executed by the distortion corrector 24 will be explained below with reference to FIGS. 3 through 5. As an example, there will be explained the case where after the distortion corrector 24 corrects the optical distortion component in the horizontal direction first, it corrects the optical distortion component in the vertical direction. The correction of the optical distortion component in the horizontal direction and the correction of the optical distortion component in the vertical direction may be executed in reverse order. In the following, the horizontal direction of the digital image data is supposed to be an x direction, and the vertical direction of the digital image data is supposed to be a y direction. The digital image data has an image size such that m pixels are arranged in the x direction and n pixels are arrange in the y direction two-dimensionally, namely, so-called m×n pixels.

Figure 3A:
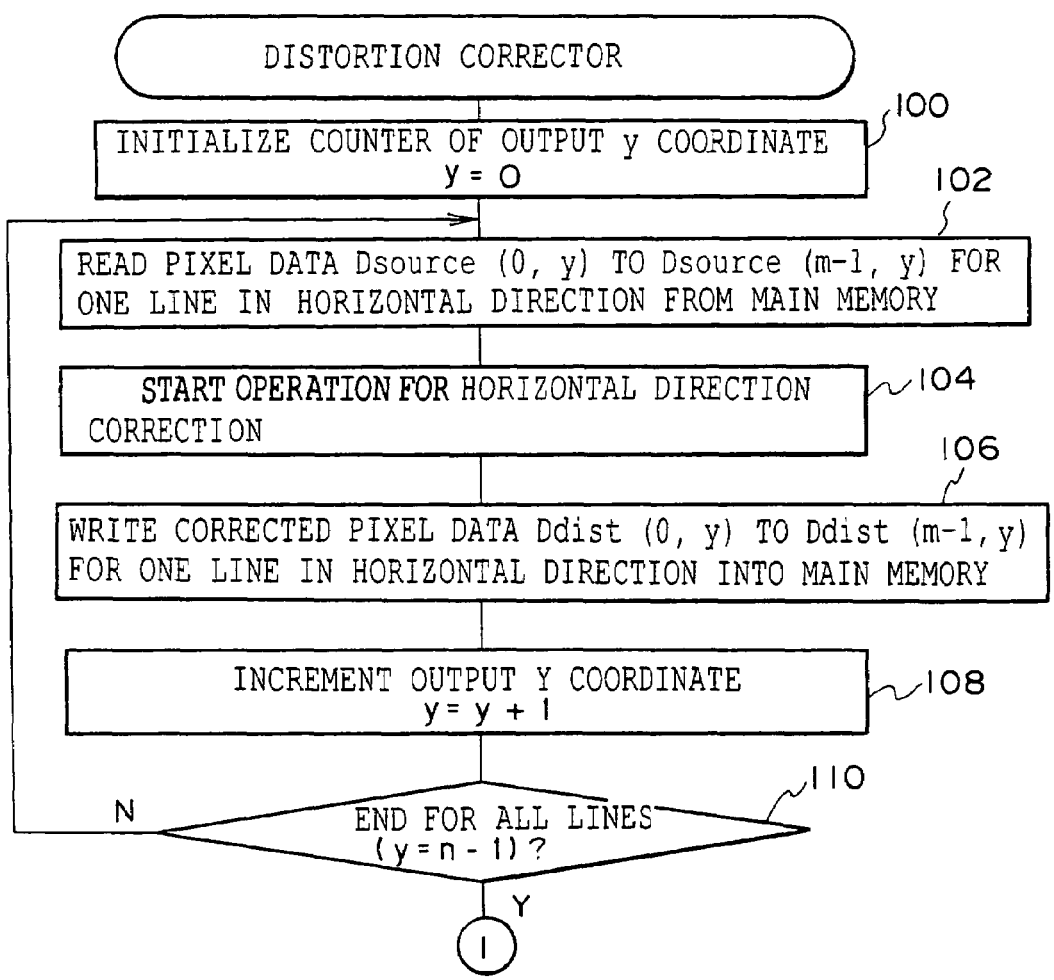
FIGS. 3A and 3B are flowcharts showing a process (optical distortion correcting process) executed in the distortion corrector according to the first embodiment.
Figure 3B:
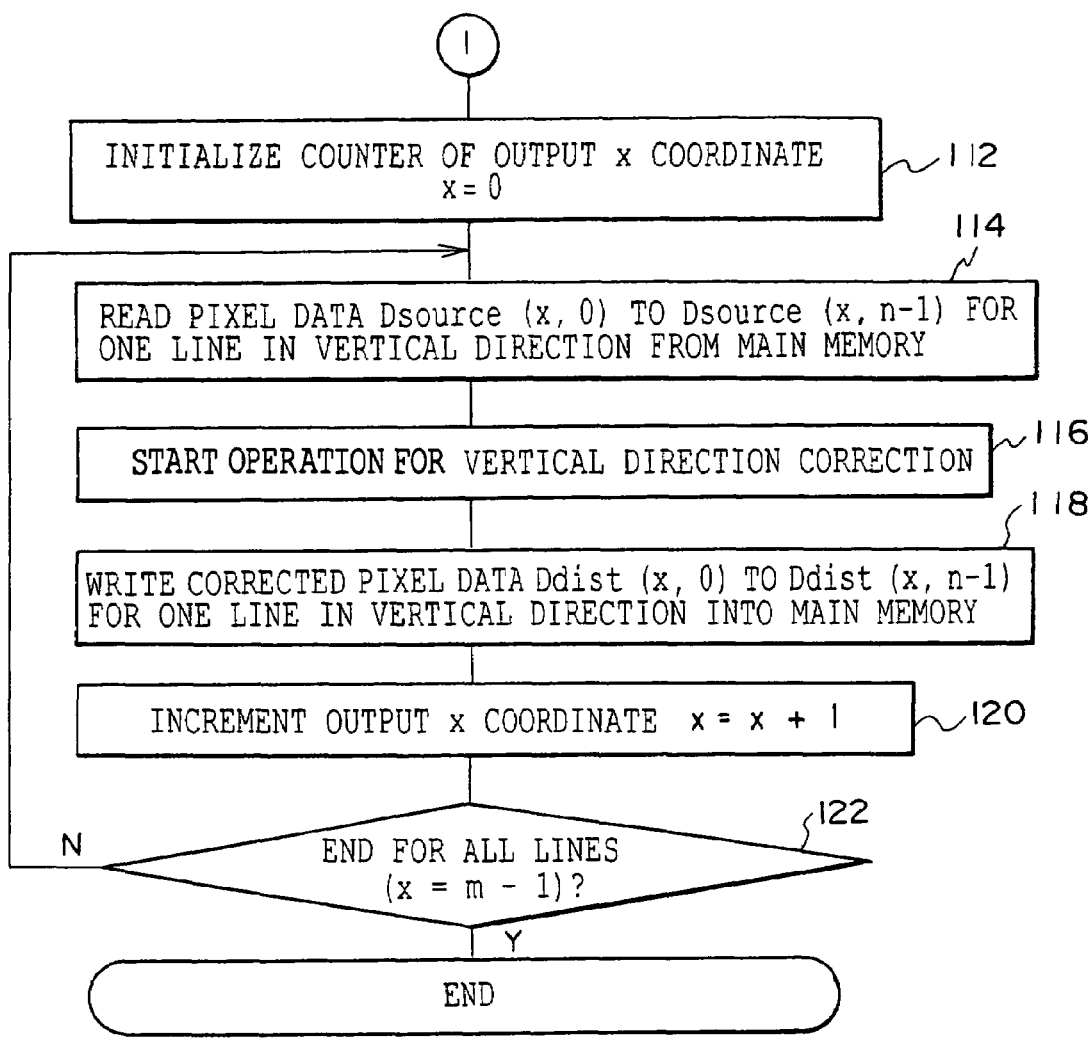

FIGS. 3A and 3B show the process in the distortion corrector 24 executed in order to correct the optical distortion. As shown in FIG. 3A, the distortion corrector 24 firstly corrects the optical distortion component in the horizontal direction. Namely, at step 100, the output coordinate setter 60 initializes a counter value of an output y coordinate for setting the output coordinate (y=0).

At step 102, the DMA input controller 52 scans pixel data positioned on the output y coordinate set by the output coordinate setter 60 in the digital image data stored in the main memory 38 in the horizontal direction (namely, the x direction). As a result, the DMA input controller 52 reads the pixel data for one line arranged in the horizontal direction, so as to store it into the input line memory 50. When the pixel data read at that time is expressed by Dsource (x, y) by using an xy coordinate of the digital image data stored in the main memory 38, pixel data Dsource (0, y) to Dsource (m−1 y) is stored in the input line memory 50.

Figure 4:
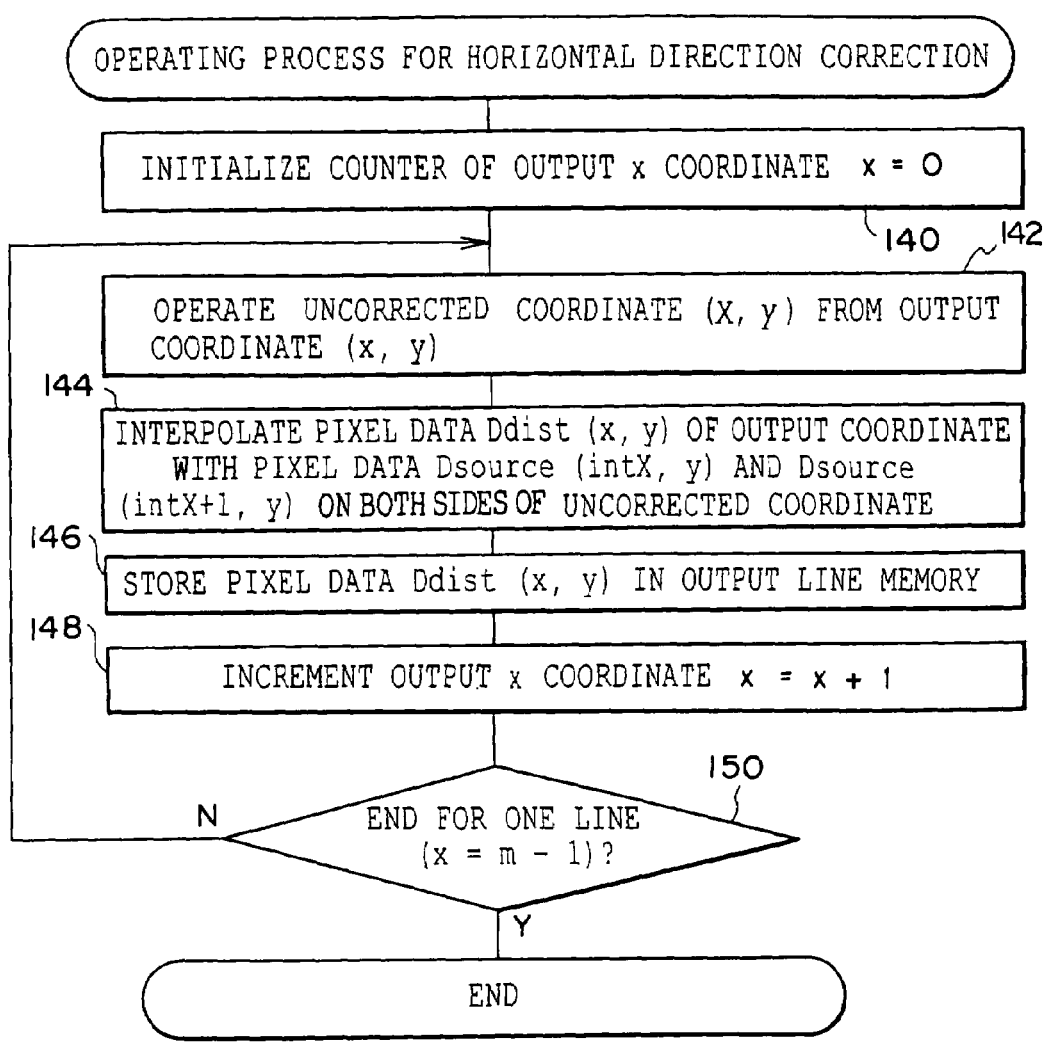
FIG. 4 is a flowchart showing an operating process for horizontal direction correction executed in the operation processor of the distortion corrector according to the first embodiment.

At next step 104, the operation processor 54 starts an operating process for horizontal direction correction shown in FIG. 4 on the pixel data for one line read into the input line memory 50.

As shown in FIG. 4, in the operating process for horizontal direction correction, at step 140, the output coordinate setter 60 initializes a counter value of the output x coordinate for setting the output coordinate (x=0). At next step 142, the coordinate operation processor 62 operates an uncorrected coordinate (X, y) corresponding to the output coordinate (x, y) set in the output coordinate setter 60.

It is generally known that a function F representing a distortion ratio due to the optical distortion can be approximately expressed by a multi-dimensional function of a distance d from a position corresponding to the optical center on the image (hereinafter, center coordinate). As one example, the function F is expressed by a biquadratic function expressed in the following equation (1):

$$F(d) = \alpha \times d^4 + \beta \times d^2 \quad (1)$$

provided that d is the distance from the optical center, and α and β are coefficients, respectively.

Figure 6:
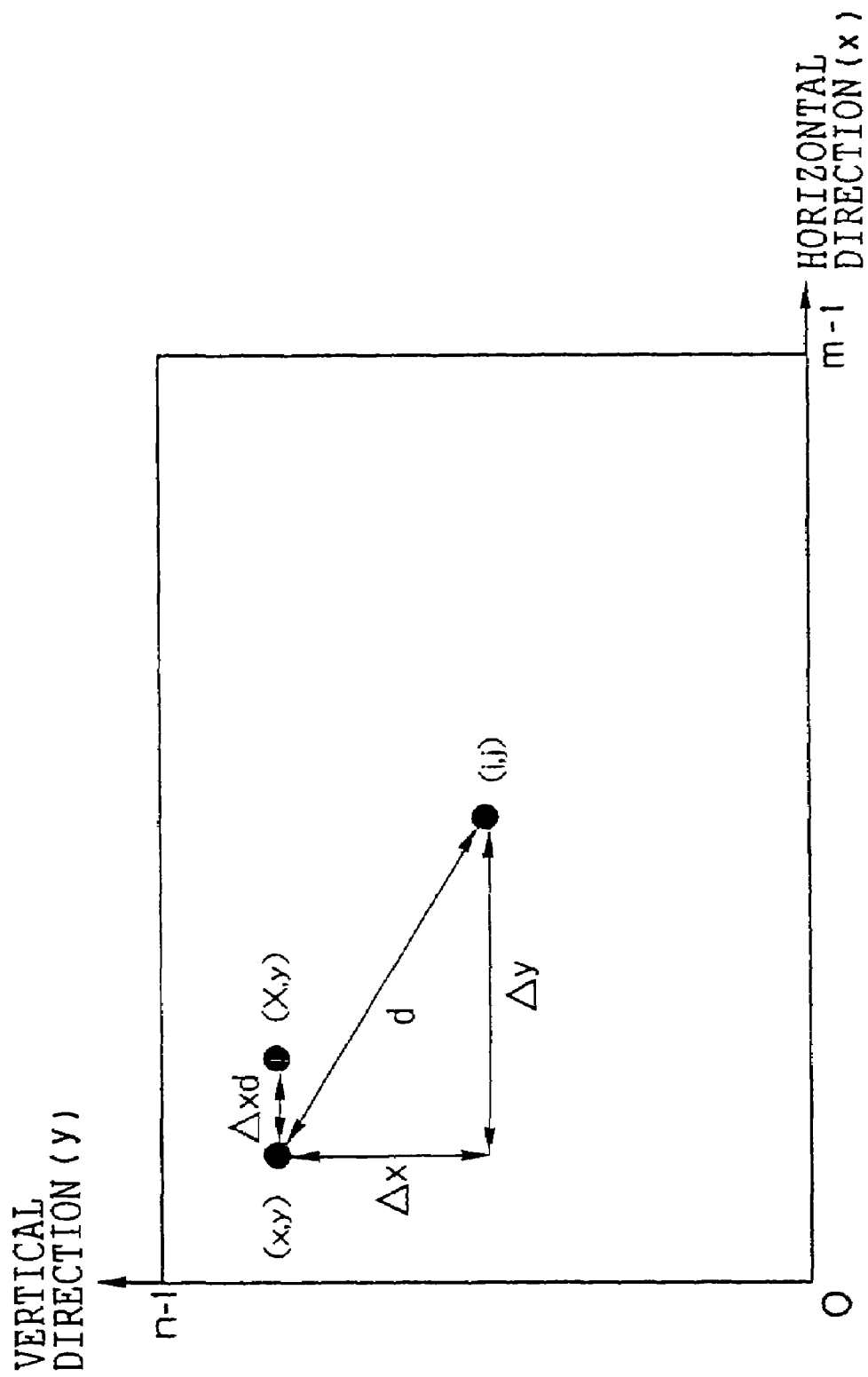
FIG. 6 is a conceptual diagram for explaining an operation of an uncorrected coordinate from an output coordinate by the operation processor according to the first embodiment.

When the output coordinate is, therefore, (x, y) (x, y: integers), the uncorrected coordinate (X, Y) corresponding to the output coordinate (x, y) is expressed by the following equation (2).

$$(X, Y) = (x - (x-i) \times F(d), y - (y-j) \times F(d)), d = ((x-i)^2 + (y-j)^2)^{1/2} \quad (2)$$

provided that the center coordinate corresponding to the optical center on the image is (i, j) as shown in FIG. 6.

the equation (1) does not include a term in which the distance d (variable) from the optical center is of an odd order, and includes only a term in which d is of an even order. As is clear from the equation (2), when the term in which d is of the odd order is included, calculation of square root is required for an operation in the term including d. When the coordinate operation processor 62 is constituted by a circuit, a hard structure becomes complicated. More specifically, the optical distortion is expressed in this manner by the function that does not include the term in which d is of the odd order and that includes only the term in which d is of the even order. As a result, the calculation of square root can be avoided. The configuration of the circuit can be, therefore, simplified.

During the operating process for horizontal direction correction, only the distortion in the horizontal direction (x direction) is considered. The coordinate operation processor 62, therefore, obtains only an x coordinate value X of the uncorrected coordinate, but a y coordinate value y of the output coordinate is directly used as the y coordinate.

The operation of the coordinate value X will be detailed below. The square of the distance d from the center coordinate of the output coordinate (x, y) becomes as follows:

$$d^2 = \Delta x^2 + \Delta y^2 \quad (3)$$

provided that $\Delta x = |x-i|$, $\Delta y = |y-j|$.

In order to enable $d^2$ to be applicable regardless of an image size, the square of the distance d is normalized as expressed in the following equation (4) so that a maximum value of the distance from the center coordinate becomes "1".

$$d^2 = d^2/SF \quad (4)$$

provided that SF is a normalizing coefficient.

Subsequently, as expressed in the following equation (5), the square of the normalized distance d obtained in the equation (4) is used, so that a term of the biquadrate of the distance d is obtained.

$$d^4 = d^2 \times d^2 \quad (5)$$

In this manner, $d^2$ and $d^4$ obtained according to the equations (4) and (5), respectively, are substituted into the equation (1). As a result, the distortion ratio F (d) on the output coordinate (x, y) can be obtained.

Next, a position where a correcting amount is "0" is adjusted by using an adjusting value γ as expressed in the following equation (6).

$$F(d) = F(d) + \gamma \quad (6)$$

Further, as expressed in the following equation (7), the adjusted distortion ratio F(d) is used, so that the correcting pixel number Δxd is obtained.

$$\Delta xd = \Delta x \times F(d) \quad (7)$$

As a result, the x coordinate value X of the uncorrected coordinate (X, y) is obtained as follows:

in the case of $x < i$, $X = x + \Delta xd$ in the case of $x \geq i$, $X = x - \Delta xd \quad (8)$ After the uncorrected coordinate (X, y) is obtained in such a manner, at next step 144, the memory controller 64 reads the pixel data around the obtained uncorrected coordinate (X, y) from the input line memory 50. The interpolation operation processor 66 carries out interpolation using the read digital image data, so as to obtain pixel data Ddist (x, y) of the output coordinate (x, y) in which the optical distortion is corrected. As the interpolating method, nearest neighbor interpolation, bi-linear interpolation, cubic convolution interpolation and the like can be applied. The case where the bi-linear interpolation is adopted will be explained below.

The memory controller 64 reads the pixel data on both sides of the uncorrected coordinate (X, y) in the x direction as peripheral pixel data of the uncorrected coordinate (X, y) from the input line memory 50. Concretely, the memory controller 64 reads Dsource (intx, y) and Dsource (intx+1, y) in which an integer portion of X is intX. As expressed in the following equation (9), the interpolation operation processor 66 obtains a weighted average, which the read pixel data Dsource (intX, y) and Dsource (intX+1, y) on both sides of the uncorrected coordinate (X, y) in the x direction is weighted according to the distance from the uncorrected coordinate (X, y), as the pixel data Dsource (X, y) of the uncorrected coordinate (X, y):

$$Dsource\ (X, y) = CF1 \times Dsource\ (intx, y) + CF2 \times Dsource\ (intx+1, y) \quad (9),$$

provided that CF1=1−CF2, CF2=X−intx.

The interpolation operation processor 66 outputs the obtained pixel data Dsource (X, y) as corrected pixel data Ddist (x, y) of the output coordinate (x, y). More specifically, $$Ddist\ (x, y) = Dsource\ (X, y) \quad (10)$$

As a result, the corrected pixel data Ddist (x, y) of the output coordinate (x, y) is obtained.

At next step 146, the memory controller 68 stores the pixel data Ddist (x, y) obtained by the operation in the interpolation operation processor 66 as the pixel data of the output coordinate (x, y) into the output line memory 56. At next step 148, the output coordinate setter 60 increments the counter value of the output x coordinate for setting the output coordinate (x=x+1).

Determination is made as NO at next step 150 until the process of all the pixels for one line arranged in the horizontal line is ended (namely, x=m−1), and the sequence returns to step 142. As a result, the similar process is executed on next pixel. The optical distortion component in the horizontal direction is, therefore, corrected on each pixel for one line read at step 102. Further, the corrected pixel data Ddist (0, y) to Ddist (m−1, y) is sequentially stored in the output line memory 56. When the process is ended on all the pixels for one line arranged in the horizontal direction stored in the input line memory 50, the operating process for horizontal direction correction of the pixels for one line is ended.

Meanwhile, as shown in FIG. 3A, after the distortion corrector 24 starts the operating process for horizontal direction correction, the sequence advances to step 106. As a result, the DMA output controller 58 reads the corrected pixel data for one line sequentially stored in the output line memory 56. Further, the DMA output controller 58 scans the corrected pixel data for one line in the horizontal direction into the main memory 38, so as to write it as the pixel data for one line arranged in the horizontal direction. At this time, the DMA output controller 58 overwrites it on the pixel data arranged in the horizontal direction of the output y coordinate set in the output coordinate setter 60 in the uncorrected digital image data. More specifically, in the digital image data stored in the main memory 38, the pixel data Dsource (0, y) to Dsource (m−1, y) is updated into the corrected pixel data Ddist (0, y) to Ddist (m−1, y).

Subsequently, at step 108, the output coordinate setter 60 increments the counter value of the output y coordinate for setting the output coordinate (y=y+1). Determination is made as NO at next step 110 until the process of all lines of the digital image data is ended (namely, y=n−1), and the sequence returns to step 102. As a result, the similar process is executed on next line. When the process is ended on all the lines of the digital image data, the correction of the optical distortion component in the horizontal direction in the digital image data is completed. At this time, the digital image data in which the optical distortion component in the horizontal direction is corrected is stored in the main memory 38.

As shown in FIG. 3B, the sequence goes to step 112 so that the distortion corrector 24 corrects the optical distortion component in the vertical direction. As a result, the output coordinate setter 60 initializes the counter value of the output x coordinate for setting the output coordinate (x=0).

Subsequently, at step 114, the DMA input controller 52 scans pixel data positioned on the output x coordinate set in the output coordinate setter 60 in the digital image data stored in the main memory 38 in the vertical direction (namely, y direction). As a result, the DMA input controller 52 read pixel data for one line arranged in vertical direction, so as to store it into the input line memory 50. When the pixel data read at this time is expressed by Dsource (x, y) by using the xy coordinate of the digital image data stored in the main memory 38, pixel data Dsource (x, 0) to D (x, n−1) is stored in the input line memory 50.

Figure 5:
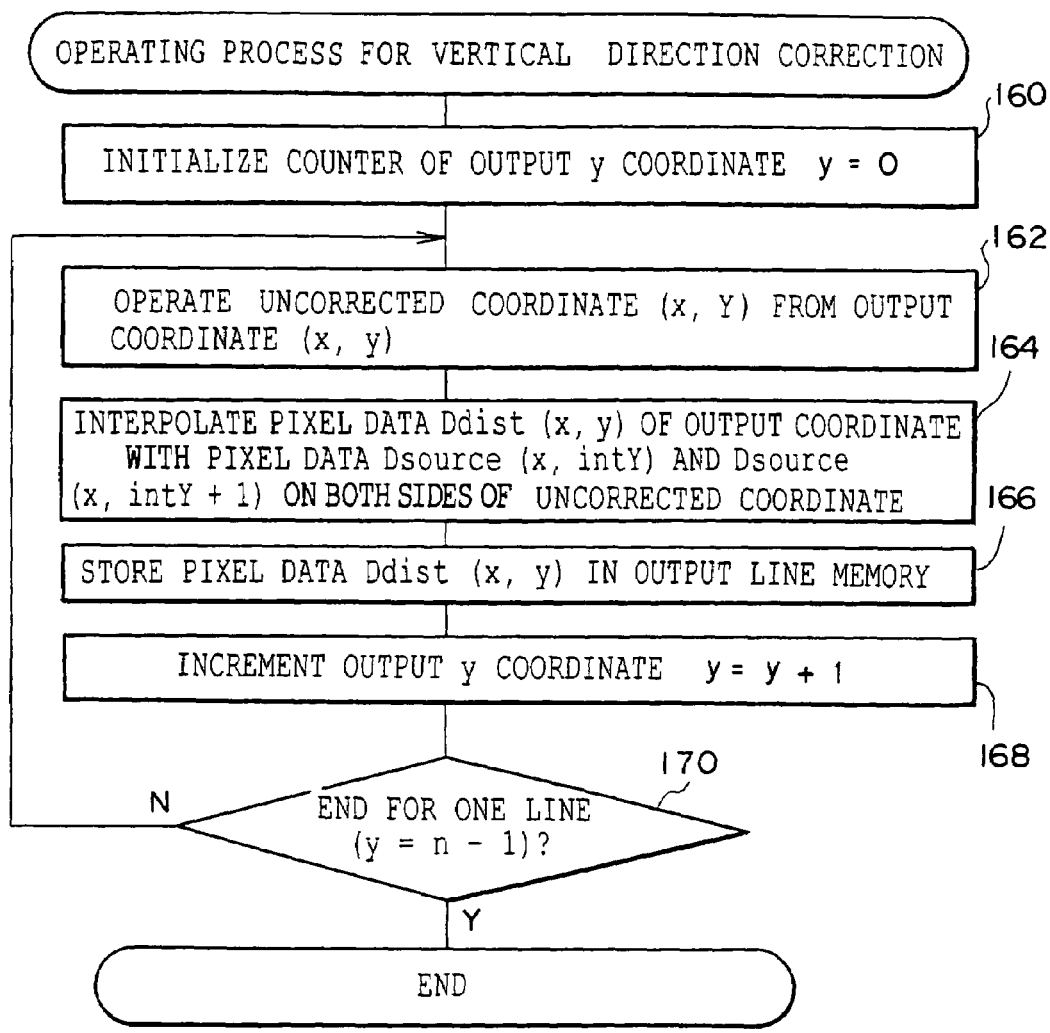
FIG. 5 is a flowchart showing an operating process for vertical direction correction executed in the operation processor of the distortion corrector according to the first embodiment.

Then, at next step 116, the pixel data for one line read into the input line memory 50 is started to be subjected to an operating process for vertical direction correction shown in FIG. 5. A different point between the operating process for vertical direction correction and the aforementioned operating process for horizontal direction correction is only the directions (horizontal direction (x direction) and vertical direction (y direction)). The operating process for vertical direction correction will be, therefore, simply explained below.

As shown in FIG. 5, in the operating process for vertical direction correction, at step 160, the output coordinate setter 60 initializes the counter value of the output y coordinate for setting the output coordinate (y=0). At next step 162, the coordinate operation processor 62 operates an uncorrected coordinate (x, Y) corresponding to the output coordinate (x, y) set in the output coordinate setter 60.

During the operating process for vertical direction correction, only the distortion in the vertical direction (y direction) is considered. The coordinate operation processor 62, therefore, obtains only the y coordinate value Y of the uncorrected coordinate, and the x coordinate value x of the output coordinate is directly used as the x coordinate. The y coordinate value Y of the uncorrected coordinate is obtained in the following manner. More specifically, the adjusted distortion ratio F (d), which is obtained by adjusting a position where a correcting amount is "0" according to the equations (3) to (6), is used, so that the correcting pixel number Δyd is obtained as expressed in the following equation (11).

$$\Delta yd = \Delta y \times F(d) \quad (11)$$

As a result, the y coordinate value Y of the uncorrected coordinate (x, Y) is obtained as follows:

in the case of $y<j$, $Y=y+\Delta yd$ in the case of $y \geq j$, $Y=y-\Delta yd$ \quad (12)

When the uncorrected coordinate (x, Y) is obtained in such a manner, at next step 164, the memory controller 64 reads pixel data around the obtained uncorrected coordinate (x, Y) from the input line memory 50. The interpolation operation processor 66 carries out interpolation using the read digital image data, so as to obtain pixel data Ddist (x, y) of the output coordinate (x, y) in which the optical distortion is corrected.

The memory controller 64 reads pixel data on both sides of the uncorrected coordinate (x, Y) in the y direction as peripheral pixel data of the uncorrected coordinate (x, Y) from the input line memory 50. Concretely, the memory controller 64 reads Dsource (x, intY) and Dsource (x, intY+1) in which an integer portion of Y is intY. The interpolation operation processor 66 obtains pixel data Dsource (x, Y) as expressed in the following equation (12):

$$D\text{source}\ (x,\ Y)=CF3\times D\text{source}\ (x,\ \text{int}Y)+CF4\times D\text{source}\ (x,\ \text{int}Y+1) \tag{12}$$

provided that $CF3=1-CF3$, $CF4=Y-\text{int}Y$.

The interpolation operation processor 66 outputs the obtained pixel data Dsource (x, Y) as the corrected pixel data Ddist (x, y) of the output coordinate (x, y). More specifically, $$D\text{dist}\ (x,\ y)=D\text{source}\ (x,\ Y) \tag{13}$$

At next step 166, the memory controller 68 stores the pixel data Ddist (x, y) as the pixel data of the output coordinate (x, y) into the output line memory 56. At next step 168, the output coordinate setter 60 increments the counter value of the output y coordinate for setting the output coordinate (y=y+1).

Determination is made as NO at next step 170 until the process is ended on all the pixels for one line arranged in the vertical line (namely, y=n-1), and the sequence returns to step 162. As a result, the similar process is executed on next pixel. The optical distortion component in the vertical direction is, therefore, corrected on each pixel for one line read at step 114. Further, the corrected pixel data Ddist (x, 0) to Ddist (x, n-1) is sequentially stored in the output line memory 56. When the process is ended on all the pixels for one line arranged in the vertical direction, the operating process for vertical direction correction of the pixels for one line is ended.

Meanwhile, as shown in FIG. 3B, after the distortion corrector 24 starts the operating process for vertical direction correction, the sequence goes to step 118. As a result, the DMA output controller 58 reads the corrected pixel data for one line sequentially stored in the output line memory 56. Further, the DMA output controller 58 scans the corrected pixel data for one line in the vertical direction into the main memory 38, so as to write it as the pixel data for one line arranged in the vertical direction. At this time, the DMA output controller 58 overwrites it on the pixel data arranged in the vertical direction of the output x coordinate set in the output coordinate setter 60 in the uncorrected digital image data. More specifically, in the digital image data stored in the main memory 38, the pixel data Dsource (x, 0) to Dsource (x, n-1) is updated into the corrected pixel data Ddist (x, 0) to Ddist (x, n-1).

Subsequently, at step 120, the output coordinate setter 60 increments the counter value of the output x coordinate for setting the output coordinate (x=x+1). Determination is made as NO at next step 122 until the process of all the lines of the digital image data is ended (namely, x=m-1), and the sequence returns to step 114. As a result, the similar process is executed on next line. When the process of all the lines of the digital image data is ended, the correction of the optical distortion component in the vertical direction is completed. As a result, the process in the distortion corrector 24 is ended.

Figure 7A:
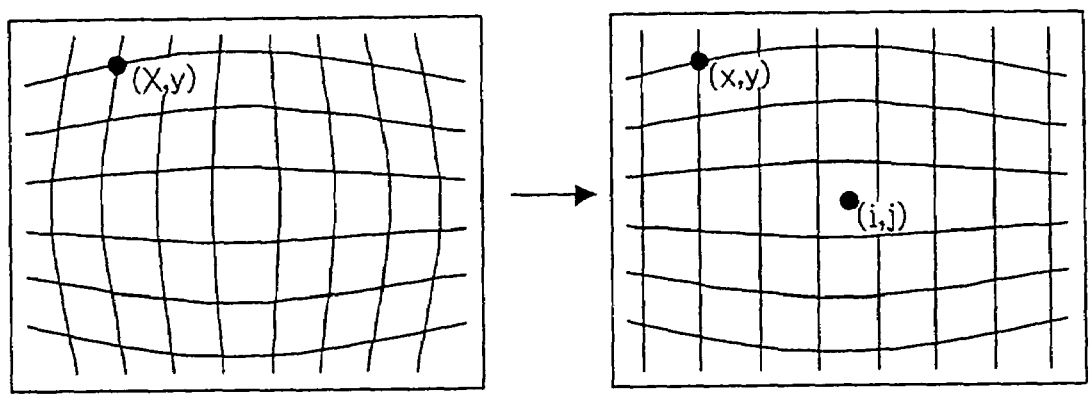
FIG. 7A is a conceptual diagram showing an uncorrected digital image data and a corrected digital image data in correction of an optical distortion component in the horizontal direction by the distortion corrector according to the first embodiment.
Figure 7B:
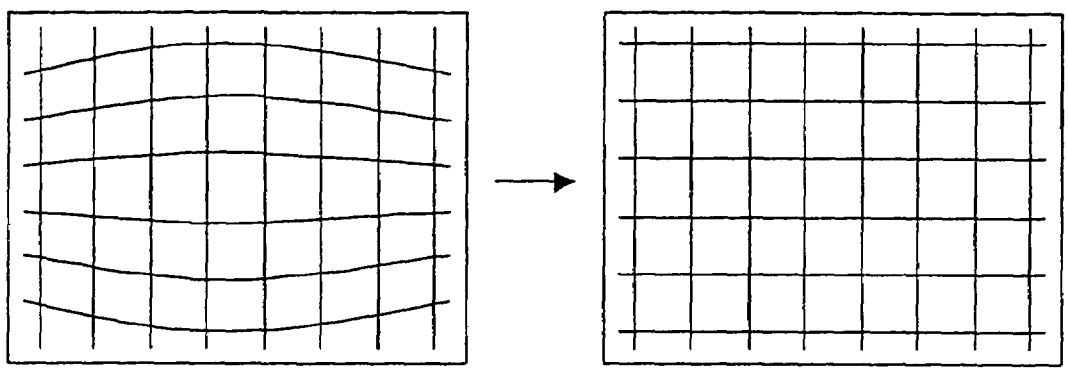
FIG. 7B is a conceptual diagram showing an uncorrected digital image data and a corrected digital image data in correction of an optical distortion component in the vertical direction by the distortion corrector according to the first embodiment.

As shown in FIG. 7A, the distortion corrector 24 scans the digital image data having optical distortion (uncorrected digital image data), which is obtained by photography using the CCD 14 and is stored in the main memory 38, in the horizontal direction so as to read it from the main memory 38. The distortion corrector 24 further corrects the optical distortion component in the horizontal direction in the digital image data, and scans the corrected digital image data in the horizontal direction into the main memory 38 so as to write it. As a result, the digital image data in which optical distortion component in the horizontal direction is corrected can be stored in the main memory 38 without changing the direction. Next, as sown in FIG. 7B, the distortion corrector 24 scans the digital image data, in which optical distortion component in the horizontal direction is corrected, in the vertical direction so as to read it. The distortion corrector 24 further corrects the optical distortion component in the vertical direction in the digital image data and, scans the corrected digital image data in the vertical direction into the main memory 38 so as to write it. As a result, the digital image data in which optical distortion component in the vertical direction is corrected can be stored in the main memory 38 without changing the direction. The digital image data in which optical distortion components in the horizontal direction and the vertical direction are corrected is, therefore, stored in the main memory 38 finally.

Thus, in this embodiment, the optical distortion in the digital image data is corrected in such a manner that the correction of the optical distortion component in the horizontal direction and the correction of the optical distortion component in the vertical direction are carried out separately. As expressed in the equations (3) to (13), when the distortion corrector 24 carries out the interpolation according to the bi-linear interpolation, the operating process can be executed by using only the two-pixel data in the periphery in the correction of the respective components. The correction can be, therefore, carried out only by the operating process which is simpler than the prior ones. As a result, the processing time required for the correction of the optical distortion can be shortened.

Further, the distortion corrector 24 can correct the optical distortion component in the horizontal direction or the vertical direction of each pixel for one line by using the pixel data for one line read in the horizontal direction or the vertical direction from the main memory 38 by the DMA input controller 52. As a result, a memory capacity of the distortion corrector 24 (memory capacity of the input line memory 50 and the output line memory 56) can be made smaller.

Furthermore, particularly in the first embodiment, the distortion corrector 24 changes the data access direction with respect to the main memory 38 according to the each direction of the optical distortion component to be corrected (the horizontal direction, the vertical direction), so as to correct the optical distortion component in the each direction. The data in which the optical distortion component in the each direction is corrected can be overwritten on the uncorrected data into the main memory 38. As a result, the memory capacity of the main memory 38 can be reduced.

SECOND EMBODIMENT

The second embodiment of the invention will be explained below. A structure of the second embodiment may be similar to that of the first embodiment. The explanation thereof will be, therefore, omitted. The second embodiment is, however, different from the first embodiment in that the data access directions of the DMA input controller 52 and the DMA output controller 58 with respect to the main memory 38 are fixed to the horizontal direction or the vertical direction and are not changed regardless of the directions of the optical distortion components to be corrected.

Figure 8:
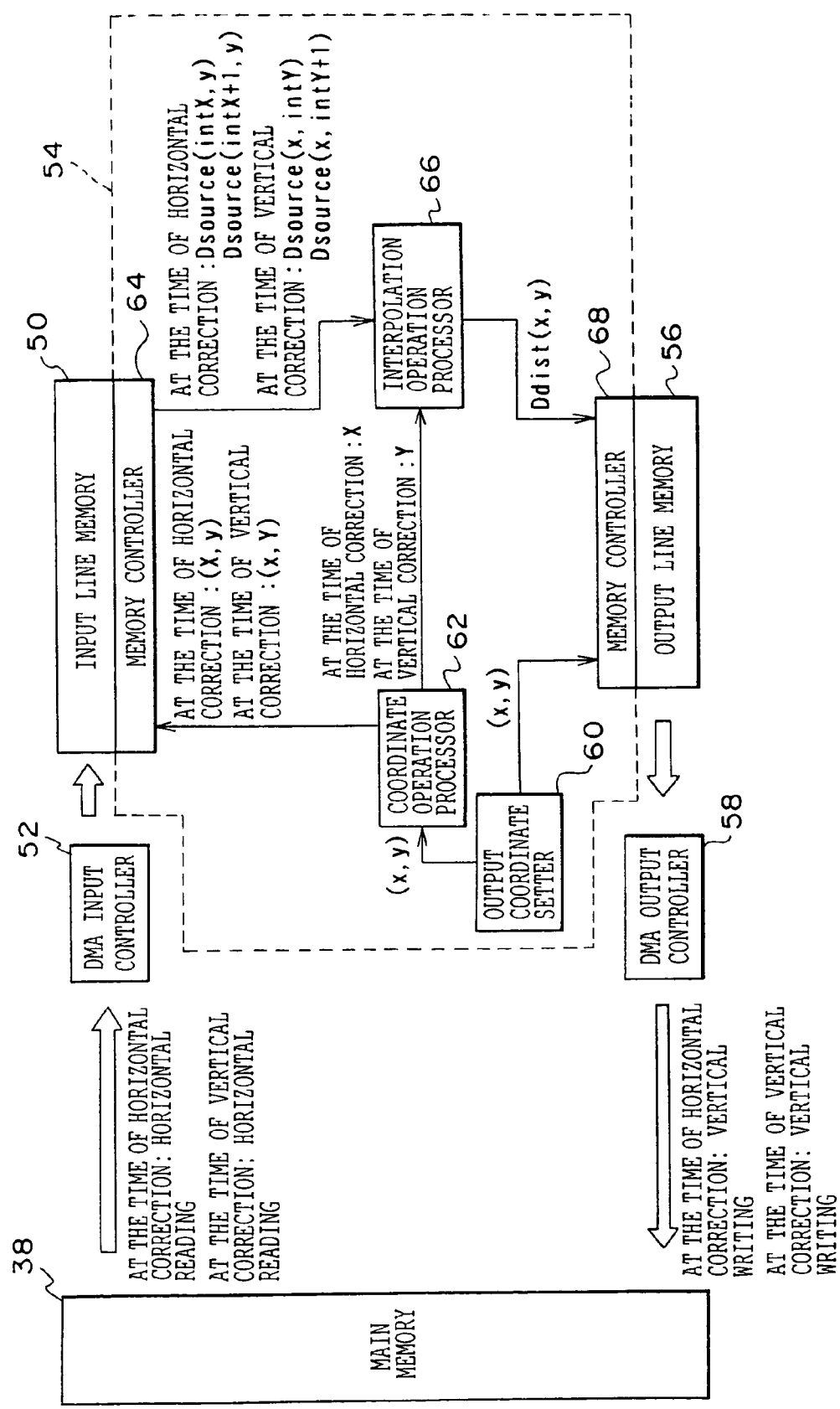
FIG. 8 is a block diagram showing a detailed structure of an operation processor of a distortion corrector according to a second embodiment.

Concretely, as shown in FIG. 8, the data access direction of the DMA input controller 52 with respect to the main memory 38 is supposed to be the horizontal direction. The DMA input controller 52 reads the digital image data from the main memory 38 in the horizontal direction. The DMA input controller 52 further stores the pixel data for one line arranged in the horizontal direction into the input line memory 50. The data access direction of the DMA output controller 58 with respect to the main memory 38 is supposed to be the vertical direction. The DMA output controller 58 reads the pixel data for one line from the output line memory 56. The DMA output controller 58 further writes the pixel data for one line into the main memory 38 in the vertical direction. A combination of the data access directions of the DMA input controller 52 and the DMA output controller 58 may be reversed.

Figure 9A:
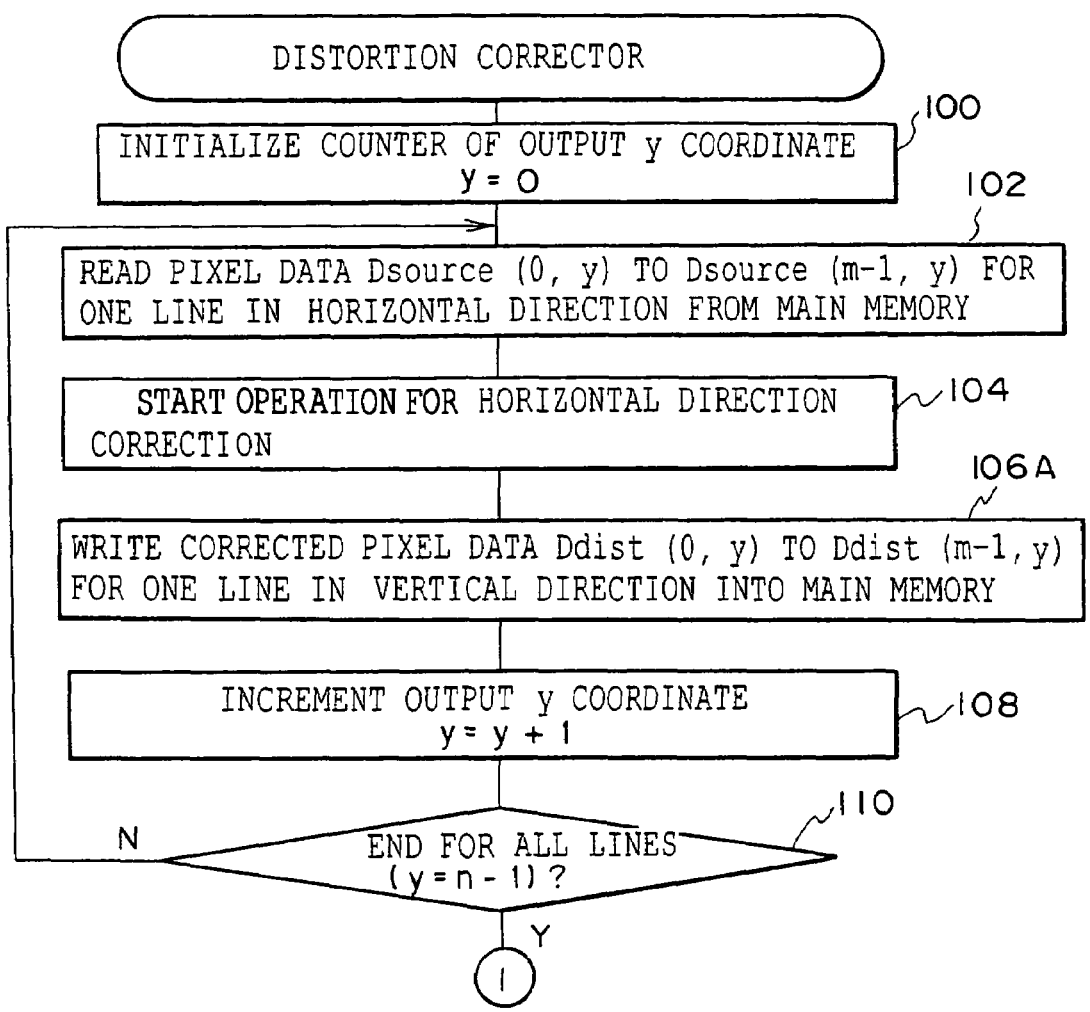
FIGS. 9A and 9B are flowcharts showing a process (optical distortion correcting process) executed by the distortion corrector according to the second embodiment.
Figure 9B:
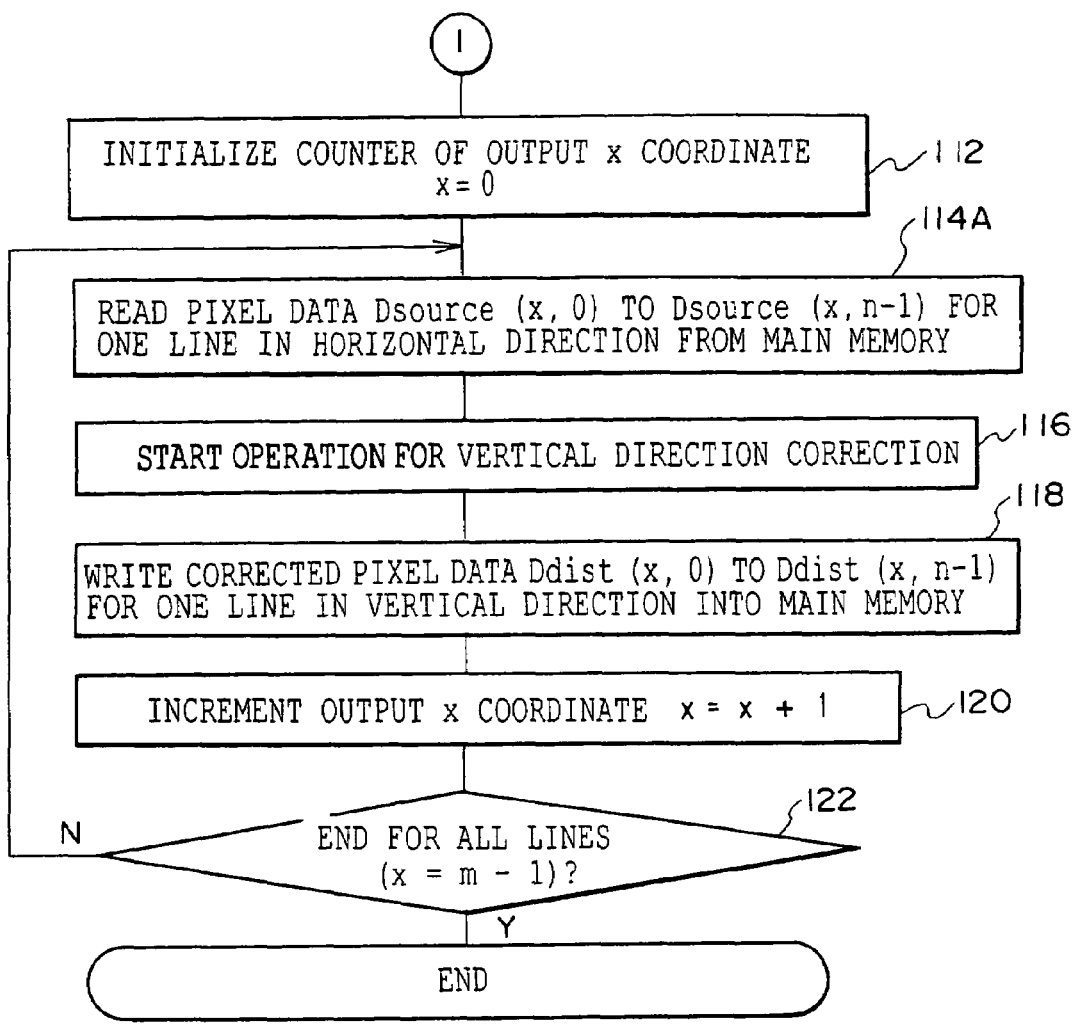

The optical distortion correcting process which is executed by the distortion corrector 24 according to the second embodiment will be explained with reference to FIGS. 9A and 9B. In FIGS. 9A and 9B, the same processes as those in FIGS. 3A and 3B are designated by the same step numbers, and the detailed explanation thereof will be omitted.

As shown in FIG. 9A, in the distortion corrector 24, the output coordinate setter 60 initializes the counter value of the output y coordinate (y=0) at step 100. At next step 102, the DMA input controller 52 scans the digital image data stored in the main memory 38 in the horizontal direction (namely, x direction). As a result, the DMA input controller 52 reads the pixel data Dsource (0, y) to Dsource (m–1, y) for one line arranged in the horizontal direction, so as to store it into the input line memory 50. Then, at step 104, the operating process for horizontal direction correction shown in FIG. 4 starts. As a result, the optical distortion component in the horizontal direction in the each read pixel for one line is corrected. The corrected pixel data Ddist (0, y) to Ddist (m–1, y) is sequentially stored into the output line memory 56.

After the operating process for horizontal direction correction is started, the distortion corrector 24 advances to step 106A. As a result, the DMA output controller 58 reads the corrected pixel data for one line sequentially stored into the output line memory 56. The DMA output controller 58 further scans the corrected pixel data for one line in the vertical direction into the main memory 38, so as to write it as the pixel data for one line arranged in the vertical direction. More specifically, the corrected pixel data for one line is turned by 90°, so as to be stored in the main memory 38.

At this time, the DMA output controller 58 writes the corrected pixel data for one line in an area different from the uncorrected digital image data (overwriting is forbidden). More specifically, in the second embodiment, the data in which optical distortion component in the each direction is corrected cannot be overwritten on the digital image data which is in the main memory 38 and is being corrected. The main memory 38, therefore, requires more memory capacity than that in the first embodiment.

Then, at step 108, the output coordinate setter 60 increments the counter value of the output y coordinate (y=y+1). Determination is made as NO at next step 110 until the process of all the lines of the digital image data is ended (namely, y=n–1), and the sequence returns to step 102. As a result, the similar process is executed on next line. When the process of all the lines of the digital image data is ended, the correction of the optical distortion component in the horizontal direction in the digital image data is completed. At this time, the digital image data in which optical distortion component in the horizontal direction is corrected is turned by 90°, so as to be stored in the main memory 38.

Then, as shown in FIG. 9B, in the distortion corrector 24, at step 112, the output coordinate setter 60 initializes the counter value of the output x coordinate (x=0). At next step 114A, the DMA input controller 52 scans the digital image data stored in the main memory 38 in the horizontal direction (namely, x direction). As a result, the DMA input controller 52 reads the pixel data for one line arranged in the horizontal direction, so as to store it into the input line memory 50. At this time, as mentioned above, the digital image data is turned by 90°, so as to be stored in the main memory 38. The pixel data Dsource (x, 0) to Dsource (x, n–1) in the digital image data in an unturned state is, therefore, read by the scanning in the horizontal direction, so as to be stored in the input line memory 50. At step 116, the operating process for vertical direction correction shown in FIG. 5 is started.

As a result, the optical distortion component in the vertical direction in the each read pixel for one line is corrected. Further, the corrected pixel data Ddist (x, 0) to Ddist (x, n–1) is sequentially stored into the output line memory 56.

After the operating process for vertical direction correction is started, the distortion corrector 24 advances to step 118. The DMA output controller 58 reads the corrected pixel data for one line sequentially stored into the output line memory 56. The DMA output controller 58 further scans the corrected pixel data for one line in the vertical direction into the main memory 38, so as to write it as the pixel data for one line arranged in the vertical direction. More specifically, the corrected pixel data for one line is turned by 90° (when the turning direction at the time of writing the pixel data in which optical distortion component in the horizontal direction is corrected is a positive direction, this turning is –90°) so as to be stored.

At this time, the DMA output controller 58 writes the corrected pixel data for one line in an area different from the digital image data in which the optical distortion component in the vertical direction is uncorrected (namely, the digital image data in which the optical distortion component in the horizontal direction is corrected) (overwriting is forbidden). More specifically, in this embodiment, in order to reduce the memory capacity of the main memory 38, the corrected pixel data for one line is overwritten on the digital image data in which the optical distortion component in the horizontal direction is uncorrected.

Then, at step 120, the output coordinate setter 60 increments the counter value of the output x coordinate (x=x+1). Further, determination is made as NO at step 122 until the process of all the lines of the digital image data is ended (namely, x=m–1), and the sequence returns to step 144A. As a result, the similar process is executed on next line. When the process of all the lines of the digital image data is ended, the correction of the optical distortion component in the vertical direction is also ended. As a result, the process in the distortion corrector 24 is ended.

Figure 10A:
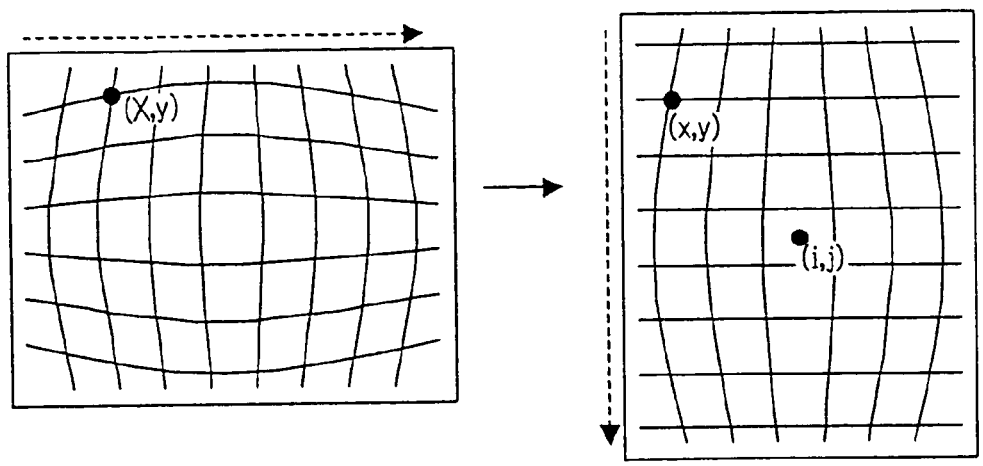
FIG. 10A is a conceptual diagram showing an uncorrected digital image data and a corrected digital image data in correction of an optical distortion component in the horizontal direction by the distortion corrector according to the second embodiment.
Figure 10B:
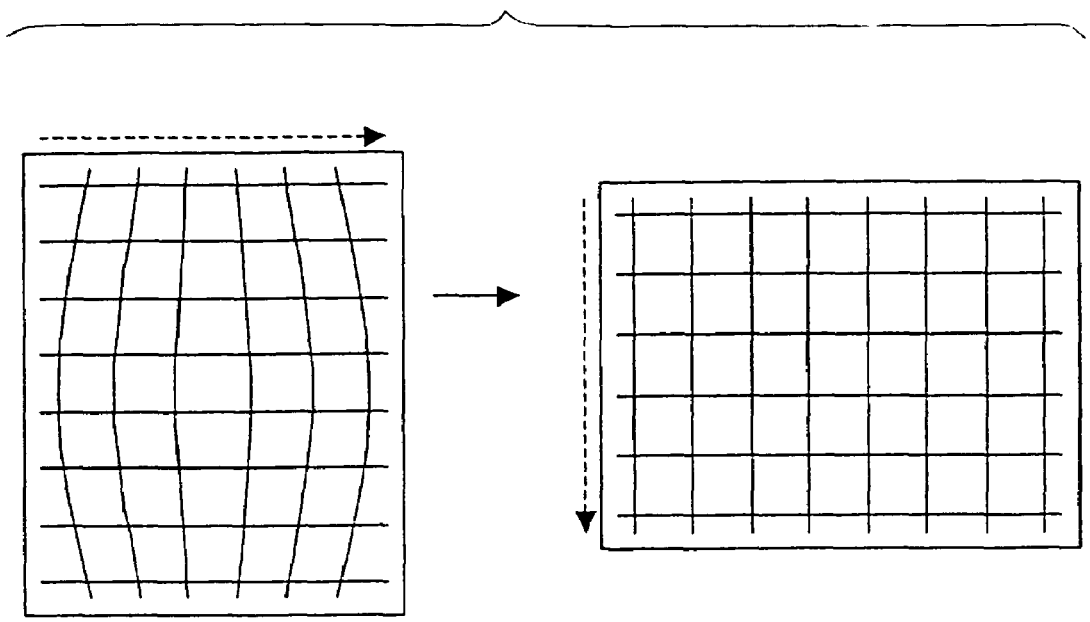
FIG. 10B is a conceptual diagram showing an uncorrected digital image data and a corrected digital image data in correction of an optical distortion component in the vertical direction by the distortion corrector according to the second embodiment.

The data access directions of the DMA input controller 52 and the DMA output controller 58 with respect to the main memory 38 are fixed to the horizontal direction and the vertical direction, respectively, so that the process is executed. More specifically, as shown in FIG. 10A, the distortion corrector 24 scans the digital image data having the optical distortion (uncorrected digital image data), which is obtained by photography using the CCD 14 and is stored in the main memory 38, in the horizontal direction so as to read it. The distortion corrector 24 further corrects the optical distortion component in the horizontal direction in the digital image data, and scans the corrected digital image data in the vertical direction into the main memory 38 so as to write it. As a result, the corrected digital image data is turned by 90°, so as to be capable of being stored. As shown in FIG. 10B, the distortion corrector 24 scans the digital image data, in which optical distortion component in the horizontal direction is corrected, in the horizontal direction so as to read it. The distortion corrector 24 corrects the optical distortion component in the vertical direction in the digital image data, and scans the corrected digital image data in the horizontal direction into the main memory 38 so as to write it. As a result, the corrected digital image data is turned by −90°, so as to be capable of being stored in the main memory 38. The digital image data in which optical distortion components in the horizontal direction and the vertical direction are corrected is, therefore, stored in the main memory 38 in the original direction of the digital image data finally.

In the second embodiment, the data access directions of the DMA input controller 52 and the DMA output controller 58 with respect to the main memory 38 are fixed in such a manner. As a result, even if the data access directions are not changed regardless of the directions of the optical distortion components to be corrected, the optical distortion included in the digital image data can be corrected in such a manner that the correcting process is divided into two steps: the correction of the optical distortion component in the horizontal direction and the correction of the optical distortion component in the vertical direction, as the first embodiment.

Particularly in the second embodiment, the data is read from the main memory 38 by accessing to the data in the horizontal direction. The data is written into the main memory 38 by accessing to the data in the vertical direction. The main memory 38 has characteristics such that the data access in the horizontal direction is faster than the data access in the vertical direction. Time for which the data is transmitted by the DMA input controller 52 and the DMA output controller 58 with respect to time for the operating process in the operation processor 54 (the operating process for horizontal direction correction or the operating process for vertical direction correction) can be averaged through the correction of the optical distortion components in the horizontal direction and the vertical direction. As a result, the entire processing time required for the correcting process can be shorter than that in the first embodiment.

Figure 11:
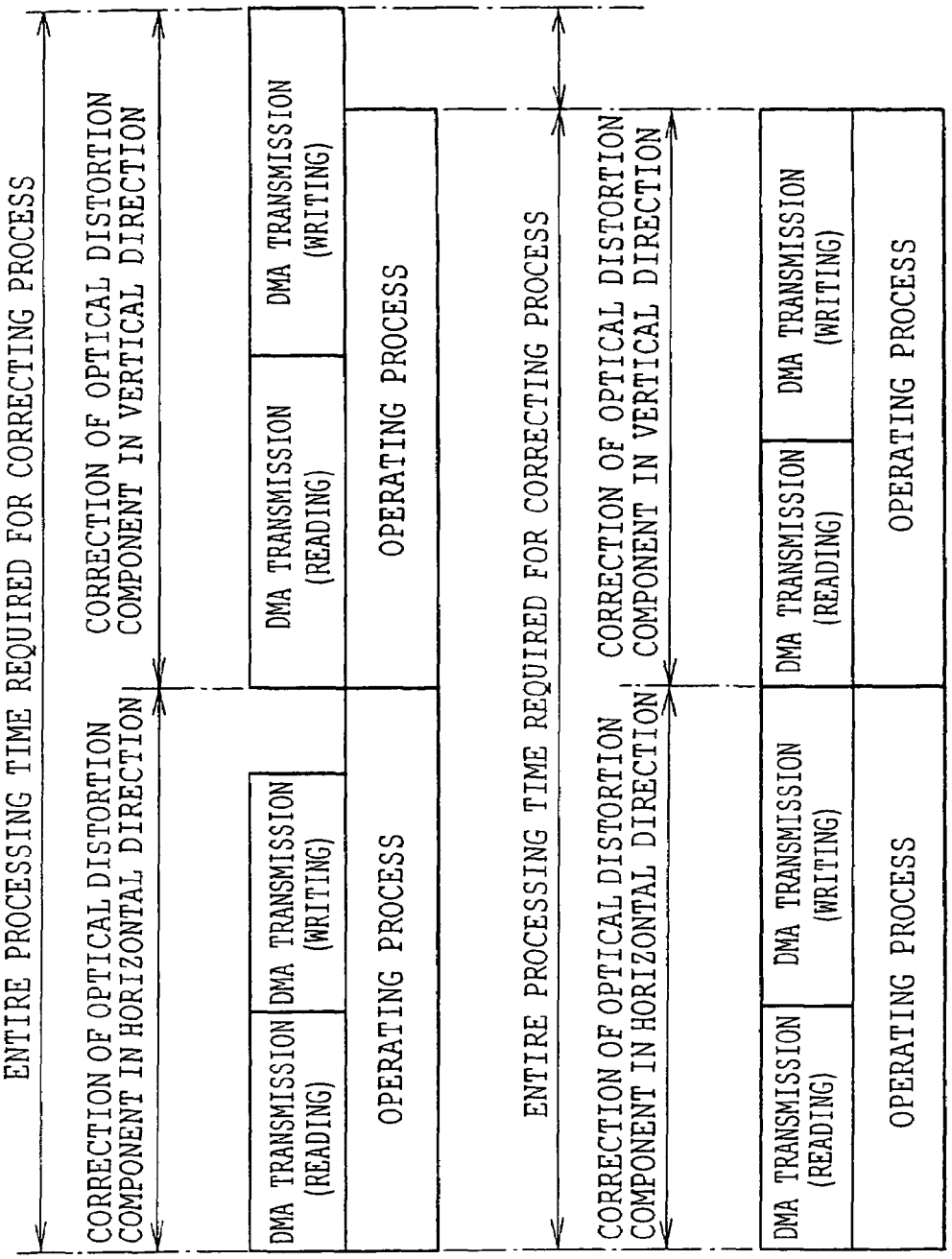
FIG. 11 is a conceptual diagram for explaining time required for the correcting process according to the first embodiment (upper part) and the second embodiment (lower part)

More specifically, in the first embodiment, as shown on the upper side of FIG. 11, when the optical distortion component in the horizontal direction is corrected, the data access to the main memory 38 is carried out in the horizontal direction, so that the pixel data is read and written. Both the reading and writing of the pixel data are, therefore, carried out at high speed. As a result, the time required for the correction of the optical distortion component in the horizontal direction is determined by the operation processing time of the operation processor 54. When the optical distortion component in the vertical direction is corrected, however, the data access to the main memory 38 is carried out in the vertical direction, so that the pixel data is read and written. Both the reading and writing of the pixel data, therefore, take much time. As a result, the time required for the correction of the optical distortion component in the vertical direction, accordingly, becomes longer.

On the contrary, in the second embodiment, as shown on the lower side of FIG. 11, when the optical distortion components in the horizontal direction and the vertical direction are corrected, the pixel data is read from the main memory 38 at high speed, and the pixel data is written into the main memory 38 at low speed. As is clear from the comparison of the lower side with the upper side in FIG. 11, the entire processing time required for the correcting process can be, therefore, shortened.

In the first embodiment and the second embodiment, after the optical distortion component in the horizontal direction (predetermined direction) in the digital image data is corrected, the optical distortion component in the vertical direction (crossing direction) in the corrected digital image data is corrected. After the optical distortion component in the vertical direction in the digital image data is corrected, however, the optical distortion component in the horizontal direction in the corrected digital image data may be corrected. The optical distortion components in the horizontal direction and the vertical direction are respectively corrected in the digital image data in which the optical distortion components in the horizontal direction and the vertical direction are uncorrected, and the digital image data in which the optical distortion component in the horizontal direction is corrected is synthesized with the digital image data in which the optical distortion component in the vertical direction is corrected. In such a manner, the optical distortion may be corrected.

In the first embodiment and the second embodiment, the output coordinate setter 60 sets the corrected coordinate (output coordinate), and the coordinate operation processor 62 calculates the uncorrected coordinate corresponding to the corrected coordinate. The output coordinate setter may, however, set the uncorrected coordinate, and the coordinate operation processor may calculate the corrected coordinate corresponding to the uncorrected coordinate.

What is claimed is:

1. A digital image data correction method comprising:
a first step of correcting an optical distortion component in a predetermined direction of optical distortion included in digital image data; and
a second step of correcting an optical distortion component in a crossing direction crossing the predetermined direction of the optical distortion, separately from the correction of the optical distortion component in the predetermined direction,
wherein the digital image data which is uncorrected in the first step and the second step is respectively corrected in the first step and the second step, and the digital image data which has been corrected in the first step is synthesized with the digital image data which has been corrected in the second step, so that the optical distortion is corrected.

2. A digital image data correction method comprising:
a first step of correcting an optical distortion component in a predetermined direction of optical distortion included in digital image data; and
a second step of correcting an optical distortion component in a crossing direction crossing the predetermined direction of the optical distortion, separately from the correction of the optical distortion component in the predetermined direction; wherein
in the first step, the digital image data is read along the predetermined direction from a storage component in which the digital image data is stored, so that the optical distortion component in the predetermined direction is corrected, and the corrected digital image data is written into the storage component parallel to the predetermined direction of the digital image data in which the optical distortion component in the predetermined direction is uncorrected; and
in the second step, the digital image data is read along the crossing direction from the storage component, so that the optical distortion component in the crossing direction is corrected, and the corrected digital image data is written into the storage component parallel to the crossing direction of the digital image data in which the optical distortion component in the crossing direction is uncorrected.

3. A digital image data correction method according to claim 2, wherein the digital image data which has been corrected in one of the first step and the second step is corrected in the other of the first step and the second step.

4. A digital image data correction method comprising:
a first step of correcting an optical distortion component in a predetermined direction of optical distortion included in digital image data; and
a second step of correcting an optical distortion component in a crossing direction crossing the predetermined direction of the optical distortion, separately from the correction of the optical distortion component in the predetermined direction; wherein
in the first step, the digital image data is read along the predetermined direction from a storage component in which the digital image data is stored, so that the optical distortion component in the predetermined direction is corrected, and the corrected digital image data is written into the storage component parallel to the crossing direction of the digital image data in which the optical distortion component in the predetermined direction is uncorrected; and
in the second step, the digital image data is read along the crossing direction from the storage component, so that the optical distortion component in the crossing direction is corrected, and the corrected digital image data is written into the storage component parallel to the predetermined direction of the digital image data in which the optical distortion component in the crossing direction is uncorrected.

5. A digital image data correction method comprising:
a first step of correcting an optical distortion component in a predetermined direction of optical distortion included in digital image data; and
a second step of correcting an optical distortion component in a crossing direction crossing the predetermined direction of the optical distortion, separately from the correction of the optical distortion component in the predetermined direction;
wherein an amount of data conversion due to the optical distortion is approximately expressed by a polynomial which depends on a distance from an optical center of the digital image data, and further wherein the polynomial is a function that does not include a term in which the distance is of an odd order and that includes only a term in which the distance is of an even order.

6. A digital image data correction method comprising:
a first step of correcting an optical distortion component in a predetermined direction of optical distortion included in digital image data; and
a second step of correcting an optical distortion component in a crossing direction crossing the predetermined direction of the optical distortion, separately from the correction of the optical distortion component in the predetermined direction,
wherein a pixel on a corrected coordinate of the corrected digital image data is interpolated with pixels around an uncorrected coordinate of the uncorrected digital image data corresponding to the corrected coordinate, so that the optical distortion component is corrected.

7. A digital image data correction apparatus for separately correcting an optical distortion component in a predetermined direction of optical distortion included in digital image data and an optical distortion component in a crossing direction crossing the predetermined direction of the optical distortion,
wherein the optical distortion component in the predetermined direction and the optical distortion component in the crossing direction are respectively corrected in the digital image data in which the optical distortion component in the predetermined direction and the optical distortion component in the crossing direction are uncorrected, and the digital image data in which the optical distortion component in the predetermined direction has been corrected is synthesized with the digital image data in which the optical distortion component in the crossing direction has been corrected, so that the optical distortion is corrected.

8. A digital image data correction apparatus for separately correcting an optical distortion component in a predetermined direction of optical distortion included in digital image data and an optical distortion component in a crossing direction crossing the predetermined direction of the optical distortion, wherein
the digital image data correction apparatus is connected with a storage component which stores the digital image data therein,
when the optical distortion component in the predetermined direction is corrected, the digital image data is read along the predetermined direction from the storage component, so that the optical distortion component in the predetermined direction is corrected, and the corrected digital image data is written into the storage component parallel to the predetermined direction of the digital image data in which the optical distortion component in the predetermined direction is uncorrected, and
when the optical distortion component in the crossing direction is corrected, the digital image data is read along the crossing direction from the storage component, so that the optical distortion component in the crossing direction is corrected, and the corrected digital image data is written into the storage component parallel to the crossing direction of the digital image data in which the optical distortion component in the crossing direction is uncorrected.

9. A digital image data correction apparatus according to claim 8, wherein one of the optical distortion component in the predetermined direction and the optical distortion component in the crossing direction is corrected in the digital image data in which the other of the optical distortion component in the predetermined direction and the optical distortion component in the crossing direction has been corrected.

10. A digital image data correction apparatus for separately correcting an optical distortion component in a predetermined direction of optical distortion included in digital image data and an optical distortion component in a crossing direction crossing the predetermined direction of the optical distortion, wherein
the digital image data correction apparatus is connected with a storage component which stores the digital image data therein,
when the optical distortion component in the predetermined direction is corrected, the digital image data is read along the predetermined direction from the storage component, so that the optical distortion component in the predetermined direction is corrected, and the corrected digital image data is written into the storage component parallel to the crossing direction of the digital image data in which the optical distortion component in the predetermined direction is uncorrected, and when the optical distortion component in the crossing direction is corrected, the digital image data is read along the crossing direction from the storage component, so that the optical distortion component in the crossing direction is corrected, and the corrected digital image data is written into the storage component parallel to the predetermined direction of the digital image data in which the optical distortion component in the crossing direction is uncorrected.

11. A digital image data correction apparatus for separately correcting an optical distortion component in a predetermined direction of optical distortion included in digital image data and an optical distortion component in a crossing direction crossing the predetermined direction of the optical distortion, wherein an amount of data conversion due to the optical distortion is approximately expressed by a polynomial which depends on a distance from an optical center of the digital image data, and further wherein the polynomial is a function that does not include a term in which the distance is of an odd order and that include only a term in which the distance is of an even order.

12. A digital image data correction apparatus for separately correcting an optical distortion component in a predetermined direction of optical distortion included in digital image data and an optical distortion component in a crossing direction crossing the predetermined direction of the optical distortion, wherein a pixel on a corrected coordinate of the corrected digital image data is interpolated with pixels around an uncorrected coordinate of the uncorrected digital image data corresponding to the corrected coordinate, so that the optical distortion component is corrected.

13. A digital image pickup apparatus comprising:

an optical lens which images an object to be photographed;

a conversion component which photoelectrically converts the imaged object, so as to output digital image data showing the object;

a storage component which stores the digital image data therein; and a correction component which separately corrects an optical distortion component in a predetermined direction of optical distortion included in the digital image data and an optical distortion component in a crossing direction crossing the predetermined direction of the optical distortion, wherein when the optical distortion component in the predetermined direction is corrected, the correction component reads the digital image data along the predetermined direction from the storage component, so as to correct the optical distortion component in the predetermined direction, and writes the corrected digital image data into the storage component parallel to the predetermined direction of the digital image data in which the optical distortion component in the predetermined direction is uncorrected, and when the optical distortion component in the crossing direction is corrected, the correction component reads the digital image data along the crossing direction from the storage component, so as to correct the optical distortion component in the crossing direction and writes the corrected digital image data into the storage component parallel to the crossing direction of the digital image data in which the optical distortion component in the crossing direction is uncorrected.

14. A digital image pickup apparatus comprising:

an optical lens which images an object to be photographed;

a conversion component which photoelectrically converts the imaged object, so as to output digital image data showing the object;

a storage component which stores the digital image data therein; and a correction component which separately corrects an optical distortion component in a predetermined direction of optical distortion included in the digital image data and an optical distortion component in a crossing direction crossing the predetermined direction of the optical distortion, wherein when the optical distortion component in the predetermined direction is corrected, the correction component reads the digital image data along the predetermined direction from the storage component, so as to correct the optical distortion component in the predetermined direction, and writes the corrected digital image data into the storage component parallel to the crossing direction of the digital image data in which the optical distortion component in the predetermined direction is uncorrected, and when the optical distortion component in the crossing direction is corrected, the correction component reads the digital image data along the crossing direction from the storage component, so as to correct the optical distortion component in the crossing direction and writes the corrected digital image data into the storage component parallel to the predetermined direction of the digital image data in which the optical distortion component in the crossing direction is uncorrected.

15. A digital image pickup apparatus comprising:

an optical lens which images an object to be photographed;

a conversion component which photoelectrically converts the imaged object, so as to output digital image data showing the object;

a storage component which stores the digital image data therein; and a correction component which separately corrects an optical distortion component in a predetermined direction of optical distortion included in the digital image data and an optical distortion component in a crossing direction crossing the predetermined direction of the optical distortion, wherein the correction component approximately expresses an amount of data conversion due to the optical distortion with a polynomial which depends on a distance from an optical center of the digital image data, and further wherein the correction component causes the polynomial to be a function that does not include a term in which the distance is of an odd order and that includes only a term in which the distance is of an even order.

16. A digital image pickup apparatus comprising:

an optical lens which images an object to be photographed;

a conversion component which photoelectrically converts the imaged object, so as to output digital image data showing the object;

a storage component which stores the digital image data therein; and a correction component which separately corrects an optical distortion component in a predetermined direction of optical distortion included in the digital image data and an optical distortion component in a crossing direction crossing the predetermined direction of the optical distortion, wherein the correction component interpolates a pixel on a corrected coordinate of the corrected digital image data with pixels around an uncorrected coordinate of the uncorrected digital image data corresponding to the corrected coordinate, so as to correct the optical distortion component.

* * * * *